(12) United States Patent
Graham

(10) Patent No.: US 9,242,344 B2
(45) Date of Patent: Jan. 26, 2016

(54) APPARATUSES METHODS FOR COOLANT DELIVERY

(75) Inventor: David C. Graham, Oakham, MA (US)

(73) Assignee: Saint-Gobain Abrasives, Inc., Worcester, MA (US)

(*) Notice: Subject to any disclaimer, the term of this patent is extended or adjusted under 35 U.S.C. 154(b) by 283 days.

(21) Appl. No.: 13/704,540

(22) PCT Filed: Jun. 13, 2011

(86) PCT No.: PCT/US2011/040123
§ 371 (c)(1),
(2), (4) Date: Feb. 28, 2013

(87) PCT Pub. No.: WO2011/106801
PCT Pub. Date: Sep. 1, 2011

(65) Prior Publication Data
US 2013/0157542 A1 Jun. 20, 2013

Related U.S. Application Data

(60) Provisional application No. 61/354,399, filed on Jun. 14, 2010.

(51) Int. Cl.
*B24B 55/03* (2006.01)
*B23Q 11/10* (2006.01)
*B24B 55/02* (2006.01)

(52) U.S. Cl.
CPC .............. *B24B 55/03* (2013.01); *B23Q 11/10* (2013.01); *B24B 55/02* (2013.01)

(58) Field of Classification Search
CPC ...... B24B 55/02; B24B 55/03; B24B 55/045; B24C 5/04; B23D 59/02; B23D 59/025; B23Q 11/10
See application file for complete search history.

(56) References Cited

U.S. PATENT DOCUMENTS

| | | | | |
|---|---|---|---|---|
| 1,765,890 A * | 6/1930 | Vates | | 125/13.01 |
| 2,462,710 A * | 2/1949 | Ballinger | | 451/450 |
| 3,334,451 A * | 8/1967 | Hutton | | 451/450 |
| 3,628,293 A * | 12/1971 | Kobayashi et al. | | 451/450 |
| 3,978,625 A * | 9/1976 | Klaassen | | 451/53 |
| 4,176,500 A * | 12/1979 | Bourgoin | | 451/450 |
| 4,197,678 A * | 4/1980 | Roll et al. | | 451/450 |
| 4,414,783 A * | 11/1983 | Vincent | | 451/450 |
| 4,619,081 A * | 10/1986 | Lipanski | | 451/450 |
| 5,087,261 A * | 2/1992 | Ryd et al. | | 606/82 |
| 5,313,743 A * | 5/1994 | Peschik | | 451/449 |
| 6,123,606 A * | 9/2000 | Hill et al. | | 451/53 |
| 6,165,053 A * | 12/2000 | Yokokawa et al. | | 451/53 |
| 6,186,872 B1 | 2/2001 | Kimura et al. | | |
| 7,014,528 B2 * | 3/2006 | Mizutani et al. | | 451/7 |
| 9,004,982 B2 * | 4/2015 | Salomon et al. | | 451/450 |
| 2004/0072513 A1 | 4/2004 | Webster | | |
| 2006/0040584 A1 | 2/2006 | Ray et al. | | |
| 2009/0146042 A1 | 6/2009 | Ihle et al. | | |

OTHER PUBLICATIONS

International Search Report from PCT/US2011/040123, dated Feb. 17, 2012, 3pgs.

* cited by examiner

*Primary Examiner* — Timothy V Eley
(74) *Attorney, Agent, or Firm* — Abel Law Group, LLP; John P Sullivan

(57) ABSTRACT

In various embodiments, a coolant delivery apparatus is presented. Namely, a coolant delivery apparatus comprises a plurality of internal channels configured to provide coolant to the work face of a grinding wheel.

15 Claims, 9 Drawing Sheets

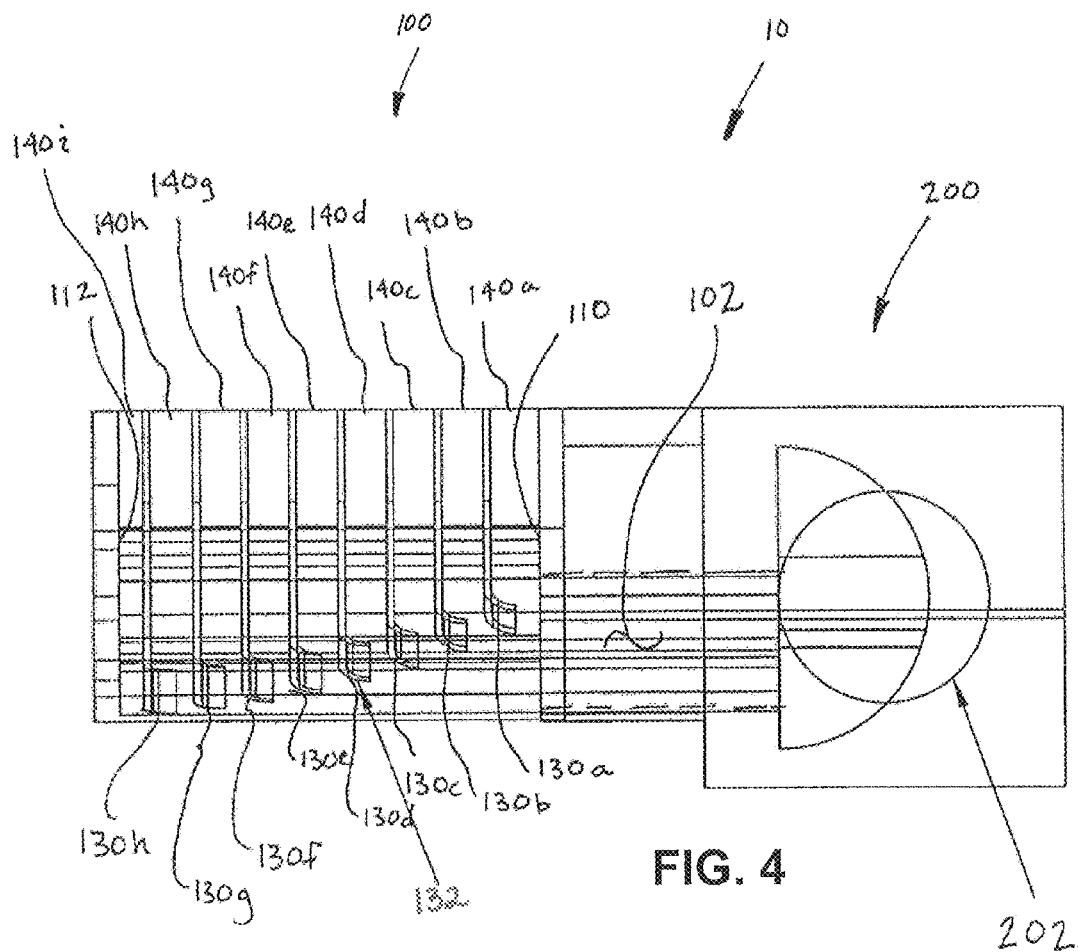
FIG. 4
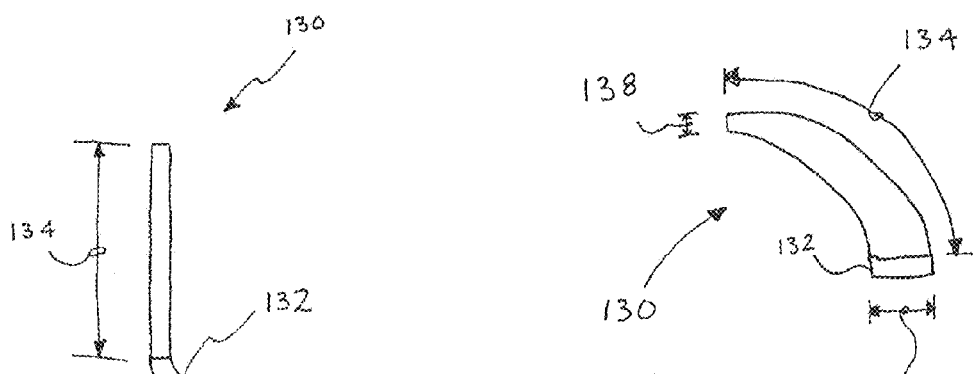
FIG. 5A
FIG. 5B

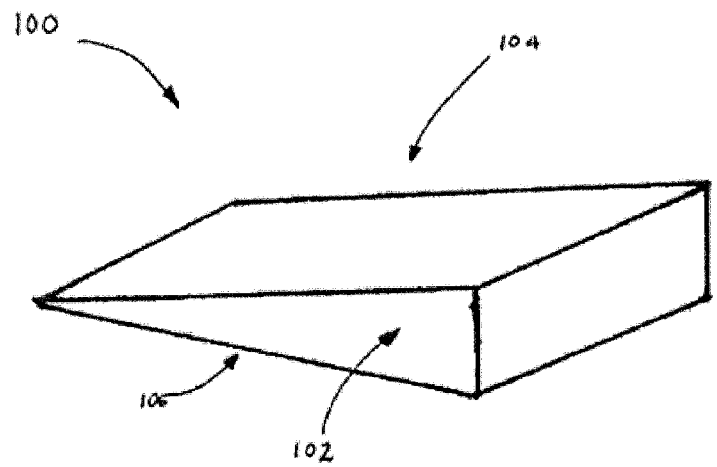
FIG. 8A
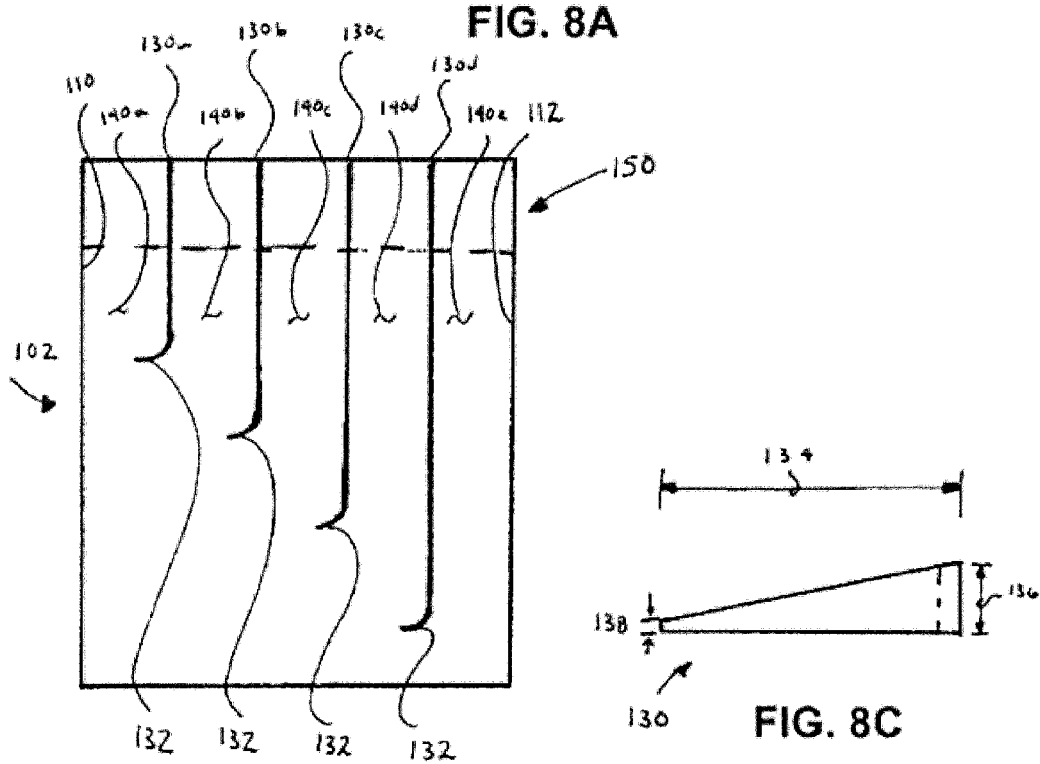
FIG. 8B
FIG. 8C

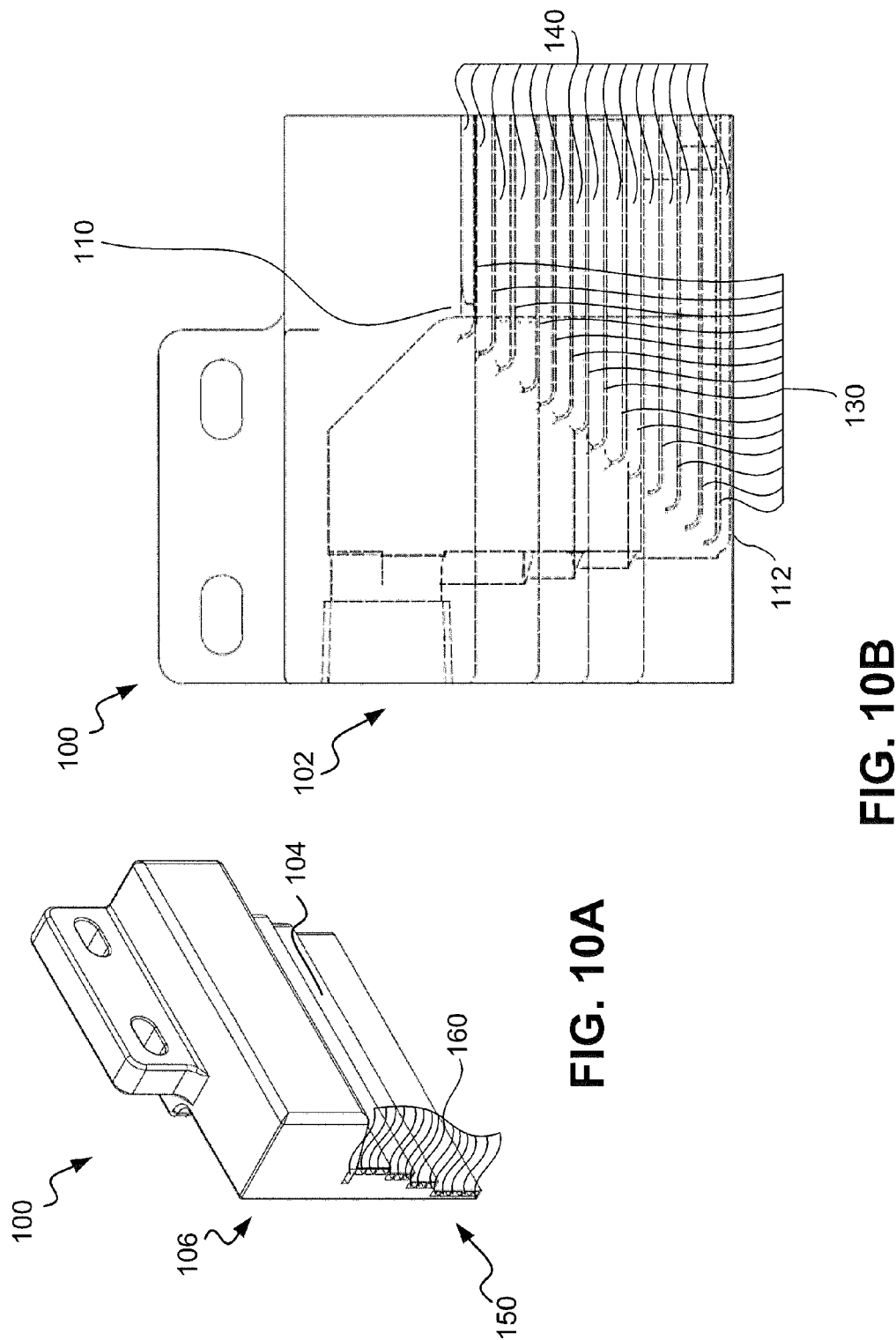

APPARATUSES METHODS FOR COOLANT DELIVERY

CROSS-REFERENCE TO RELATED APPLICATION

The present application claims priority from PCT Application No. PCT/US11/40123, filed Jun. 13, 2011, entitled "Apparatuses Methods for Coolant Delivery" naming inventor David C. Graham, which in turn claims priority to U.S. Provisional Patent Application Ser. No. 61/354,399 filed Jun. 14, 2010, entitled "Apparatuses Methods for Coolant Delivery" naming inventor David C. Graham, which are all incorporated by reference herein in their entirety.

FIELD OF THE INVENTION

The present disclosure relates generally to coolant delivery apparatuses configured to supply a coolant to a grinding wheel.

BACKGROUND

Cylindrical grinding is a machining process in which an abrasive grinding wheel is used to remove material from a workpiece. In a typical cylindrical grinding operation, a grinding wheel is mounted on a quill. A spindle or rotating shaft supplies rotational motion to the quill and grinding wheel. The grinding wheel rotates at a high rate of speed and is brought into contact with the workpiece at the grind zone. The abrasive grains of the grinding wheel shear very small chips from the surface of the workpiece, generating large amounts of heat. A coolant fluid is supplied to the grind zone both to dissipate heat and to remove the chips to prevent clogging.

One type of cylindrical grinding is inside diameter (ID) grinding. In a typical ID grinding operation, the grinding wheel is placed in a hole in the workpiece such that there is a small gap between the grinding wheel and the part. Because of the small size of the gap, it can be difficult to supply coolant to the grind zone. Material may become packed into the grinding wheel surface, clogging the operation.

Prior art inventions address the problem of supplying coolant to the grind zone in an ID operation by targeting a stream of coolant in the gap between the grinding wheel and the work surface. In some applications, coolant is targeted (e.g. with a jet or a sprayer) about 90° from the grind zone, perpendicular to the rotational direction of the wheel. In other applications, coolant is fed through the spindle. In each case, the coolant often fails to effectively reach the grind zone.

SUMMARY

Exemplary embodiments of the present disclosure are directed to apparatus, systems and methods relating to coolant delivery.

In one aspect, a nozzle is disclosed comprising a nozzle inlet, one or more internal channels in fluid communication with the nozzle inlet, and a nozzle outlet in fluid communication with the one or more internal channels, where: the nozzle inlet is configured to receive a fluid in a first flow direction; and the internal channels are configured to direct the fluid from the first direction to a second direction substantially different from the first direction.

In various embodiments the nozzle may be curved about a central axis, and the first flow direction is parallel to the central axis. The nozzle outlet may comprise one or more channel outlets equal in number to the one or more internal channels in other embodiments. The nozzle may further comprise: a support member comprising a feed chamber, where the support member is coupled to the nozzle and the feed chamber is in fluid communication with the nozzle inlet.

In other embodiments, the nozzle further comprises a plurality of internal ribs separating the one or more internal channels. In some embodiments, each rib further comprises a lip that curves out of the plane of the rib. Each channel is adjacent to at least one rib in certain embodiments.

In other aspects, a nozzle is disclosed that is configured to receive a fluid, the nozzle comprising: an inlet and an outlet; and a plurality of ribs, each rib comprising a length; where the length of at least a first rib is less than the length of at least a second rib.

In some embodiments, each rib further comprises a lip curving from the plane of the rib. Each rib has a first height and a second height, where the first height is greater than the second height in certain embodiments. The nozzle may further comprise a top side comprising a first length; and an under side comprising a second length, where the first length is greater than the second length. The nozzle may further comprise a support member comprising a feed chamber, where the feed chamber is in fluid communication with the inlet.

In other aspects, a nozzle is disclosed comprising a nozzle inlet, a nozzle outlet, and n number of internal ribs between the nozzle inlet and the nozzle outlet, where n is a positive integer. The nozzle may comprises (n+1) number of internal channels in certain embodiments, and may further comprise (n+1) number of channel outlets in other embodiments.

Embodiments of the nozzle may further comprising a proximal wall and a distal wall, where (n−1) number of internal channels are formed between adjacent ribs, one internal channel is formed between a rib and the proximal wall, and one internal channel is formed between a rib and the distal wall. Embodiments of the nozzle may comprise an under side and the channel outlets are disposed along the under side. In various embodiments, n is selected from the group comprising 1, 2, 3, 4, 5, 6, 7, 8, 9, 10, 11, 12, 13, 14, 15, 16, 17, 18, 19, and 20.

In still other respects, an apparatus is disclosed comprising: a support member comprising a feed chamber; and a nozzle comprising a nozzle inlet in fluid communication with the feed chamber, a plurality of internal channels in fluid communication with the nozzle inlet, and a nozzle outlet in fluid communication with the internal channels; where the nozzle inlet is configured to receive a fluid in a first flow direction and the plurality of internal channels are configured to direct the fluid from the first direction to a second direction substantially perpendicular to the first direction. In certain embodiments, the support member is configured to be coupled to a spindle housing. Embodiments of the apparatus may further comprise a plurality of ribs between and forming the plurality of internal channels in some embodiments. The nozzle outlet further comprises a plurality of channel outlets in still other embodiments.

Methods of applying a coolant to a grind zone are disclosed, comprising: obtaining a system comprising: a grinding wheel configured to rotate a work piece; a coolant; and a nozzle comprising a nozzle inlet, a plurality of internal channels in fluid communication with the nozzle inlet, and a nozzle outlet in fluid communication with the nozzle outlet, where the nozzle inlet is configured to receive the coolant in a first flow direction and the plurality of internal channels are configured to direct the coolant from the first direction to a second direction substantially different from the first direction; rotating the grinding wheel; contacting the grinding wheel to the work piece at a grind zone; supplying the coolant to the nozzle; and applying the coolant to the grind zone with the nozzle.

Other methods of applying a coolant to a grind zone are disclosed, comprising: obtaining a system comprising: a grinding wheel configured to rotate; a work piece; a coolant; and a nozzle comprising: a nozzle inlet and a nozzle outlet; and a plurality of ribs forming a plurality of channels in fluid communication with the nozzle inlet and the nozzle outlet, each rib comprising a length; where the length of at least a first rib is less than the length of at least a second rib; rotating the grinding wheel; contacting the grinding wheel to the work piece at a grind zone; supplying the coolant to the nozzle such that the coolant is directed through the nozzle inlet to the plurality of channels and out the nozzle outlet; and applying the coolant to the grind zone with the nozzle.

Still other methods of applying a coolant to a grind zone are disclosed, comprising: obtaining a system comprising: a grinding wheel configured to rotate; a work piece; a coolant; and a nozzle comprising a nozzle inlet, n number of ribs forming (n−1) number of channels and a nozzle outlet, where n is a positive integer and the channels are in fluid communication with the nozzle inlet and nozzle outlet; rotating the grinding wheel; contacting the grinding wheel to the work piece at a grind zone; and supplying the coolant to the nozzle such that the coolant is directed through the nozzle inlet to the plurality of channels and out the nozzle outlet; and applying the coolant to the grind zone with the nozzle.

Methods of applying a coolant to a grind zone are disclosed, comprising: obtaining a system comprising: a grinding wheel configured to rotate; a work piece; a coolant; and an apparatus comprising: a nozzle comprising a plurality of internal channels in fluid communication with a nozzle inlet; and a support member coupled to the nozzle, where the support member comprises a feed chamber in fluid communication with the nozzle inlet; where the nozzle inlet is configured to receive the coolant in a first flow direction and the plurality of internal channels are configured to direct the coolant from the first direction to a second direction substantially different from the first direction; rotating the grinding wheel; contacting the grinding wheel to the work piece at a grind zone; supplying the coolant to the apparatus; and applying the coolant to the grind zone with the nozzle.

BRIEF DESCRIPTION OF THE DRAWINGS

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method that "comprises," "has," "includes" or "contains" one or more steps possesses those one or more steps, but is not limited to possessing only those one or more steps. Likewise, a connector that "comprises," "has," "includes" or "contains" one or more elements possesses those one or more elements, but is not limited to possessing only those elements. For example, in a connector that comprises a nipple and a port, the connector includes the specified elements but is not limited to having only those elements. For example, such a connector could also include an annular sleeve.

The term "in partial contact" means that there is less than total contact between two surfaces. For example, a first surface is in partial with a second surface if there are portions of the first surface that do not contact or otherwise touch portions of the second surface.

Further, a device or structure that is configured in a certain way is configured in at least that way, but it can also be configured in other ways than those specifically described.

While exemplary embodiments of the present invention have been shown and described in detail below, it will be clear to the person skilled in the art that changes and modifications may be made without departing from the scope of the invention. As such, that which is set forth in the following description and accompanying drawings is offered by way of illustration only and not as a limitation. The actual scope of the invention is intended to be defined by the following claims, along with the full range of equivalents to which such claims are entitled.

In addition, one of ordinary skill in the art will appreciate upon reading and understanding this disclosure that other variations for the invention described herein can be included within the scope of the present invention. For example, some embodiments may utilize the support system in seating applications, including but not limited to, wheelchairs, chairs, recliners, benches, etc.

In the following Detailed Description of Disclosed Embodiments, various features are grouped together in several embodiments for the purpose of streamlining the disclosure. This method of disclosure is not to be interpreted as reflecting an intention that exemplary embodiments of the invention require more features than are expressly recited in each claim. Rather, as the following claims reflect, inventive subject matter lies in less than all features of a single disclosed embodiment. Thus, the following claims are hereby incorporated into the Detailed Description of Disclosed Embodiments, with each claim standing on its own as a separate embodiment.

Figures 1A, 1B:
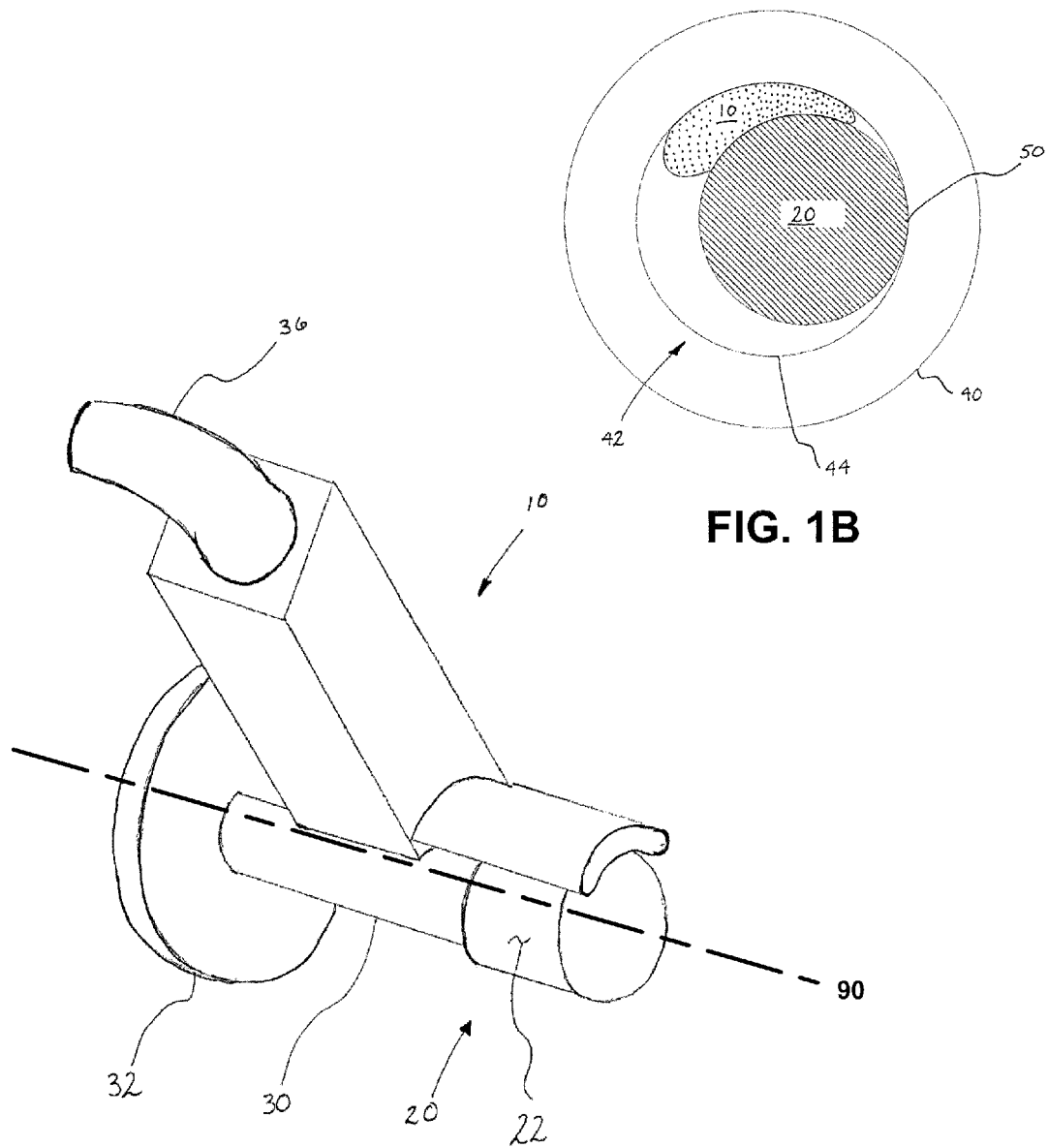

FIG. 1A illustrates an embodiment of a coolant delivery apparatus used with a grinding wheel.

FIG. 1B illustrates an end view of an embodiment of a coolant delivery apparatus used in an inside diameter grinding operation.

Figures 2, 3:
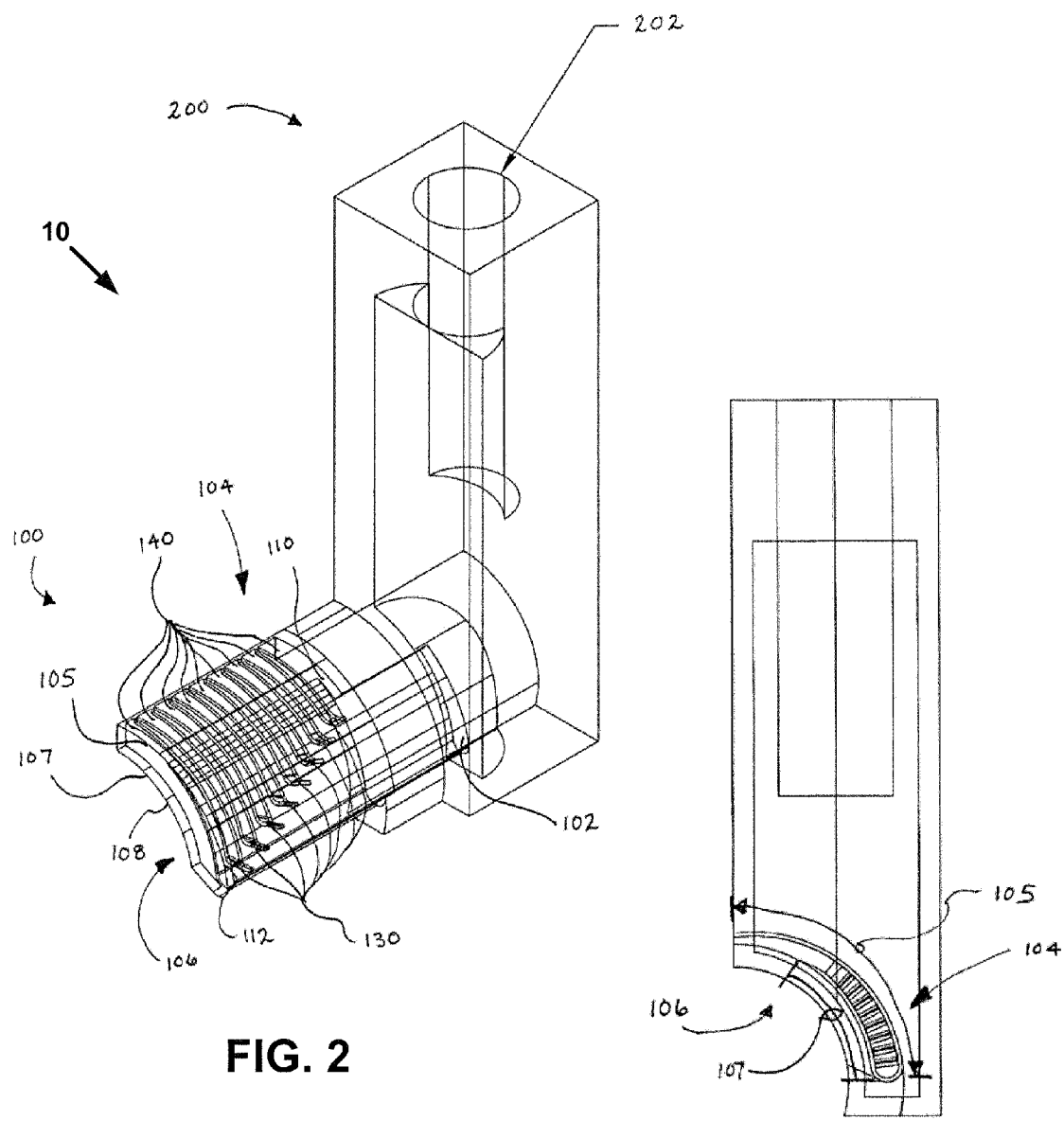

FIG. 2 illustrates an isometric view of one embodiment of a coolant delivery apparatus.

FIG. 3 illustrates a side view of one embodiment of a coolant delivery apparatus.

FIG. 4 illustrates a top view of one embodiment of a coolant delivery apparatus.

FIGS. 5A and 5B illustrate side and top views of one embodiment of a rib.

Figure 6:
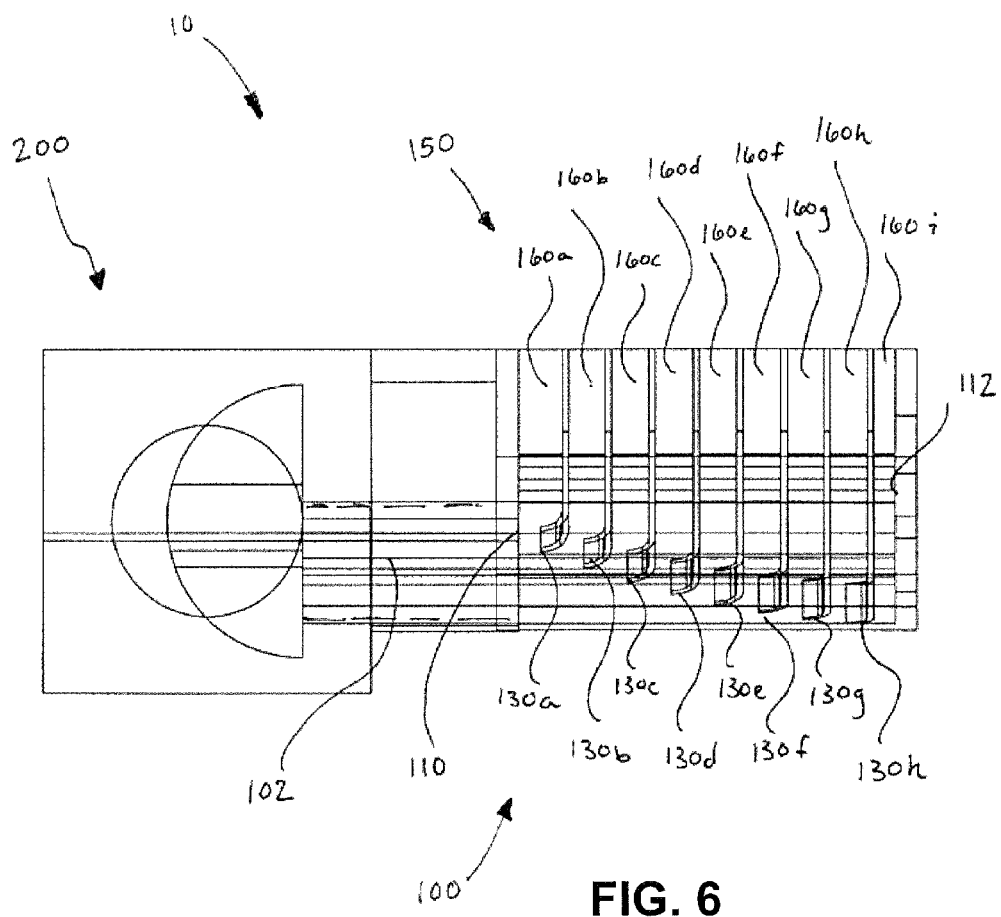

FIG. 6 illustrates a bottom view of one embodiment of a coolant delivery apparatus.

Figure 7:
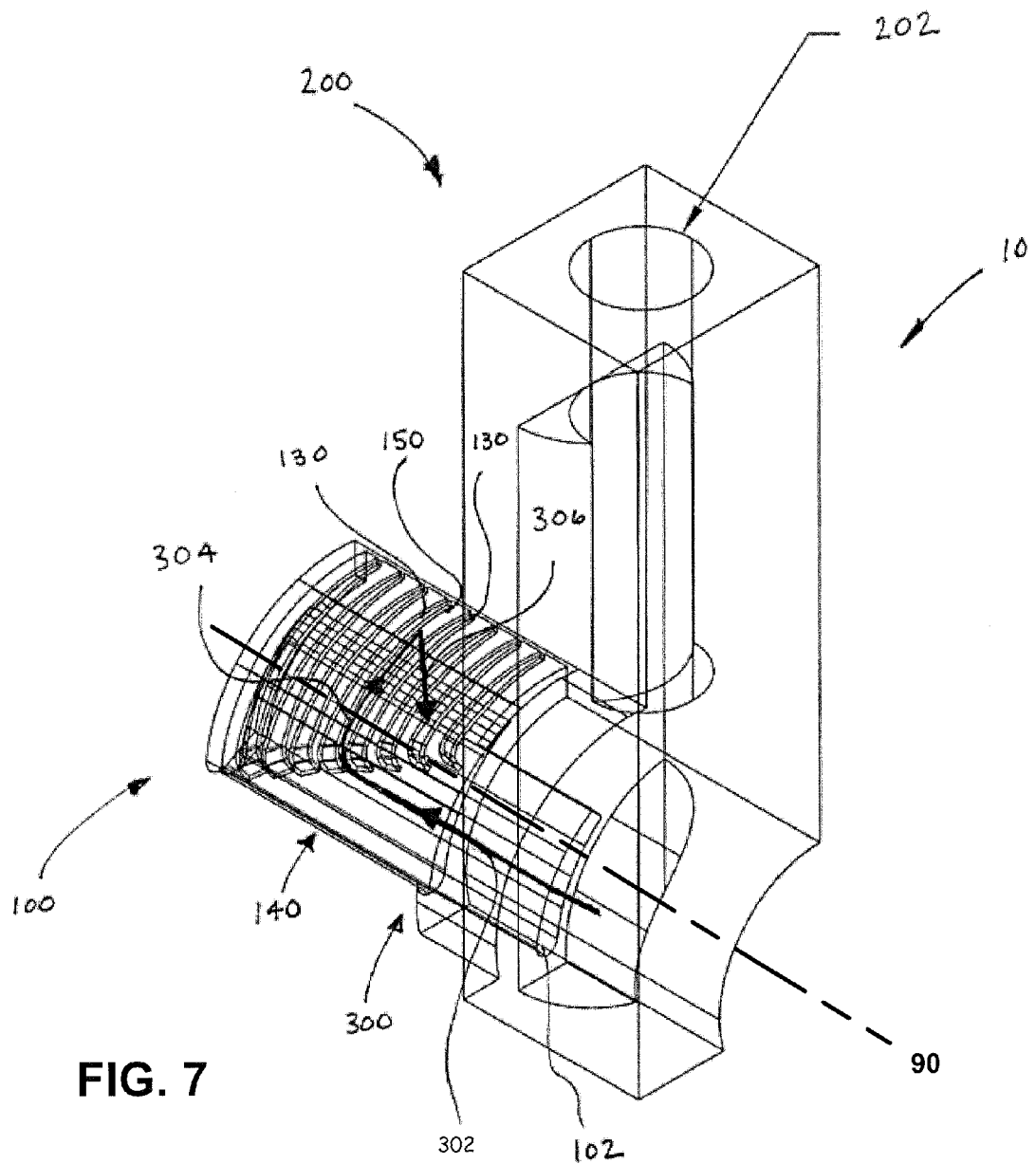

FIG. 7 illustrates the path of a coolant through one embodiment of a coolant delivery apparatus.

FIGS. 8A-8C illustrate an embodiment of a nozzle.

Figure 9A:
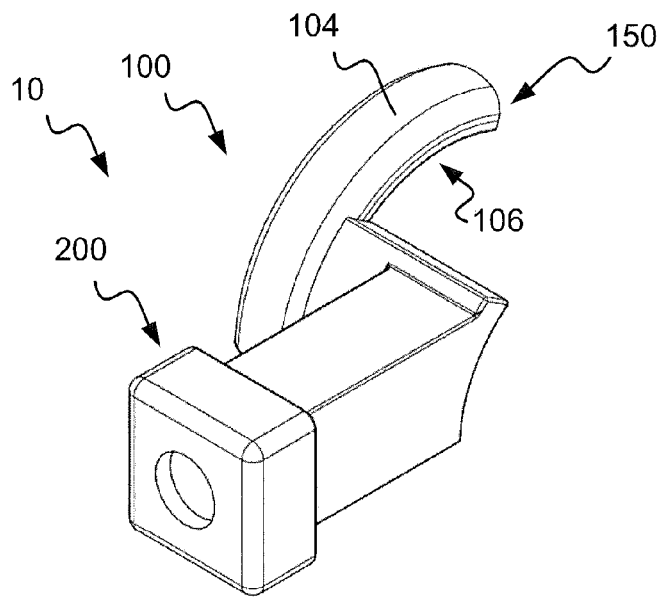
Figure 9B:
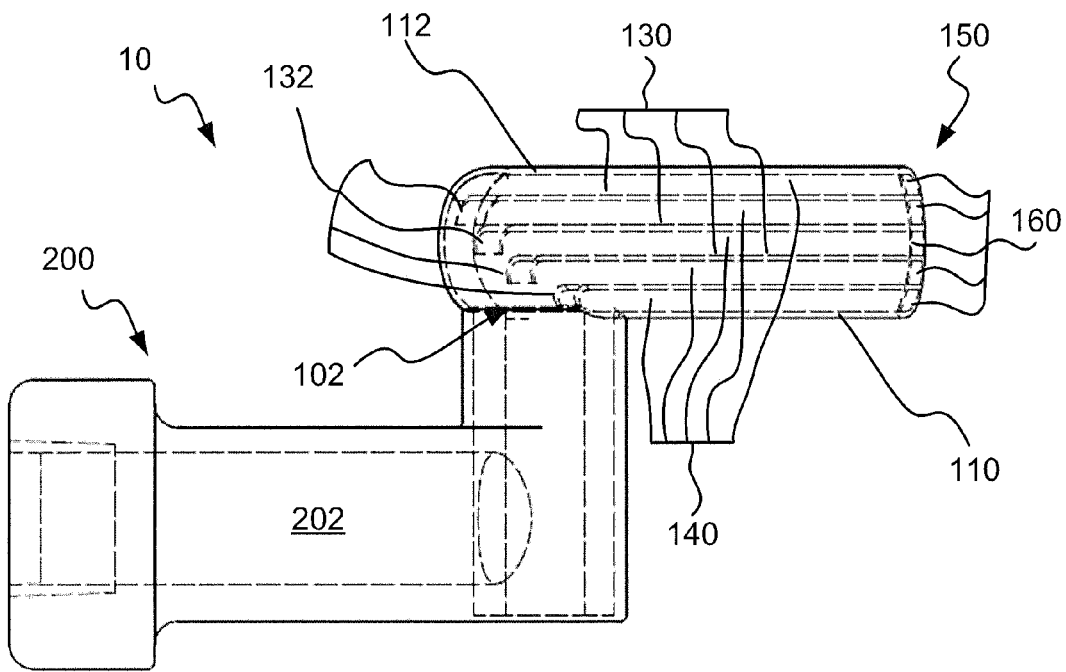

FIGS. 9A-9B illustrate an embodiment of a coolant delivery apparatus.

Figure 10C:
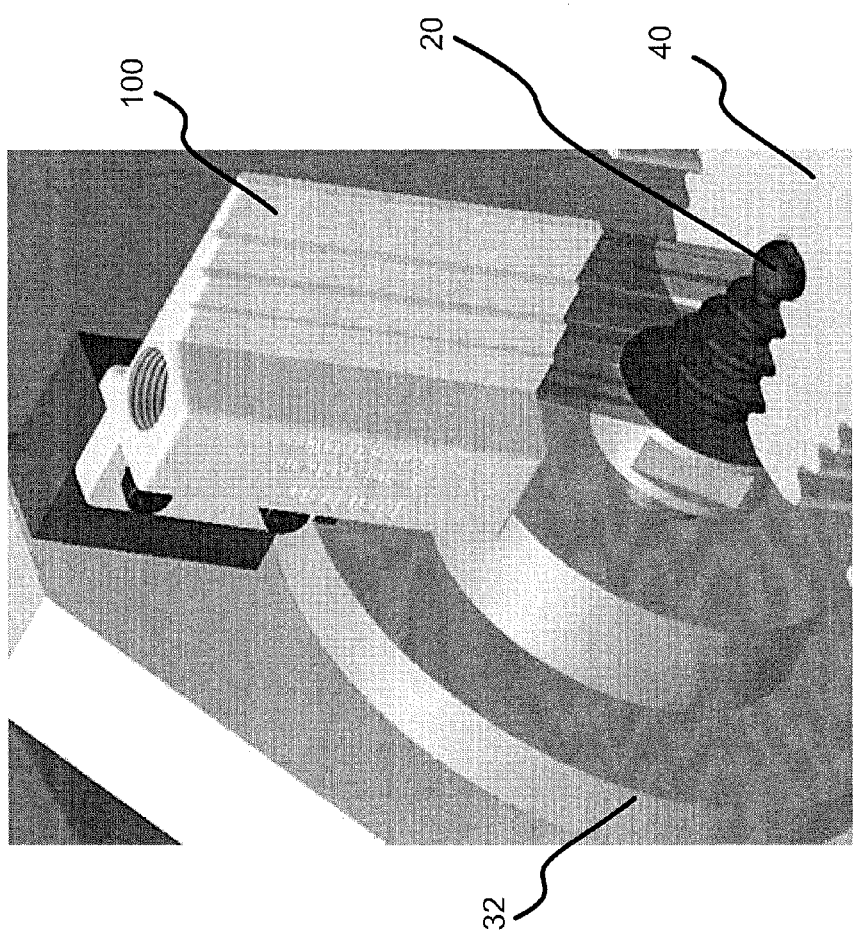

FIGS. 10A-10C illustrate an embodiment of a nozzle.

Drawings are not to scale. Certain features may be exaggerated or not shown in order to more clearly communicate the embodiment illustrated.

DETAILED DESCRIPTION OF EXEMPLARY EMBODIMENTS

Exemplary embodiments of the present disclosure are directed to apparatuses and systems configured to deliver coolant to a grind wheel used in a grinding operation. Some exemplary embodiments are discussed in relation to ID grinding operations. Other exemplary embodiments are discussed in relation to grinding operations where the grinding wheel has a complete profile. The present disclosure may be used with these or other grinding systems.

In certain exemplary embodiments, the apparatus may be made using additive manufacturing techniques, including selective laser sintering (SLS) and direct metal laser sintering (DMLS). In laser sintering processes, a computer-guided high-power laser is selectively applied to a powder bed comprising plastic, metal, or ceramic powder. The laser selectively fuses powdered material by scanning cross-sections generated from a three-dimensional digital description of the part on the surface of the powder bed. After a cross-section is laser sintered, the powder bed is lowered by one layer. A new layer of material is then applied on top and the process is repeated until a solid, three-dimensional part has been formed.

Turning now to FIGS. 1A and 1B, an embodiment of a coolant delivery apparatus 10 is shown configured to be used with a grinding wheel 20 mounted to a quill 30. Quill 30 is shown coupled to a spindle 32. Spindle 32 is configured to supply rotational motion to quill 30 and grinding wheel 20 such that grinding wheel 20 rotates about axis 90. Work face 22 is comprised of an abrasive material such that when grinding wheel 20 rotates and is brought into contact with a workpiece 40 at grind zone 50, grinding wheel 20 shears very small chips from the surface of workpiece 40.

Grinding operations generate large amounts of heat due to friction. In addition, chips may build up at grind zone 50 between work piece 40 and grinding wheel 20, which may clog the system and cause grinding wheel 20 to stop rotating, halting the grinding operation. A coolant is supplied to grind zone 50 both to dissipate heat and remove chips from grind zone 50.

Coolant delivery apparatus 10 is configured to be coupled to a coolant supply line 36. Coolant supply line 36 delivers coolant through coolant delivery apparatus 10 to work face 22 of grinding wheel 20. In some embodiments, coolant delivery apparatus 10 is configured to be mounted on the spindle housing (not shown). In other embodiments, coolant delivery apparatus 10 is configured to be mounted on coolant supply line 36 or other convenient machine or fixture element.

When configured for use with ID grinding operations, as shown in FIG. 1B, both coolant delivery apparatus 10 and grinding wheel 20 can fit inside the hole 42 of workpiece 40. Grinding wheel 20 is configured to grind inside surface 44 of hole 42. Workpiece 40 is configured to rotate such that grinding wheel 20 can grind the entire inside surface 44.

FIGS. 2-6 depict one embodiment of coolant delivery apparatus 10. FIG. 2 illustrates an isometric view of one embodiment of coolant delivery apparatus 10. Coolant delivery apparatus 10 comprises a nozzle 100 coupled to a support member 200. Nozzle 100 is configured to deliver a coolant to the grinding surface of a grinding wheel (not pictured). Nozzle 100 may be curved, fender-shaped, wing-shaped, triangular, rectangular, trapezoidal, or of any other suitable shape. In the illustrated embodiment, nozzle 100 is curved to fit the gap between grinding wheel 20 and inside surface 44 of workpiece 40. In some embodiments, certain portions of nozzle 100 are concentric with grinding wheel 20, while other portions are not.

In the illustrated embodiment, support member 200 comprises a feed chamber 202. Feed chamber 202 is configured to be coupled to a coolant source (not pictured). Nozzle 100 comprises a nozzle inlet 102 in fluid communication with feed chamber 202. Nozzle 100 comprises a proximal internal wall 110 adjacent nozzle inlet 102 and a distal internal wall 112 opposite nozzle inlet 102. Further, a plurality of ribs 130 are disposed within nozzle 100 such that a plurality of channels 140 are formed. In some embodiments, nozzle 100 comprises a splash guard 108 configured to partially cover the end of grinding wheel 20 such that coolant is directed across work face 22 and splashing is inhibited.

As shown in FIG. 3, nozzle 100 comprises a top side 104 and an under side 106. Top side 104 has a first length 105 and under side 106 has a second length 107. First length 105 is greater than second length 107, forming a nozzle outlet 150 on under side 106 of nozzle 100. In other embodiments, nozzle outlet 150 may be located on top side 104 of outlet 100. In still other embodiments, nozzle outlet 150 may be located between top side 104 and bottom side 106.

FIG. 4 shows a top view of coolant delivery apparatus 10 with top side 104 of nozzle 100 removed for clarity. A plurality of ribs 130 are disposed within nozzle 100 such that a plurality of channels 140 are formed. As shown in FIGS. 5A and 5B, each rib 130 shares certain features in common. In the illustrated embodiment, each rib 130 comprises an length 134 and a lip 132. Each rib 130 is of the same general cross-sectional shape as nozzle 100, and may be curved, fender-shaped, triangular, rectangular, trapezoidal, or of any other suitable shape. In the illustrated embodiment, each rib 130 comprises lip 132 that curves out from the plane of rib 130. In other embodiments, less than all ribs 130 may have lip 132. In other embodiments, distal internal wall 112 may comprise lip 132.

Each rib 130 has a first height 136 and a second height 138. In the illustrated embodiment, first height 136 is greater than 138. In other embodiments, first height 136 may be equal to second height 138. In some embodiments where nozzle 100 has a substantially triangular cross section, ribs 130 may also have a substantially triangular cross section. In such embodiments, second height 138 may be substantially less than first height 136, or may be zero (i.e., rib 130 tapers to a point).

Here, ribs are generally designated as 130, lengths are generally designated as 134, and channels are generally designated as 140. In certain specific embodiments, ribs 130 and channels 140 are given a letter designation (e.g., 130a, 130b, etc.) indicating proximity to nozzle inlet 102. Certain dimensions of ribs (e.g. lengths 134, first heights 136, and second heights 138) are given letter designations corresponding to the letter designation given to the rib. For example, rib 130a will have length 134a, first height 136a, and second height 138a.

Referring to the embodiment illustrated in FIG. 4, nozzle 100 comprises eight ribs 130 forming nine channels 140. Channel 140a is formed between rib 130a and interior proximal wall 110. Channel 140b is formed between rib 130b and rib 130a. Channel 140c is formed between rib 130c and rib 130b. Channel 140d is formed between rib 130d and rib 130c. Channel 140e is formed between rib 130e and rib 130d. Channel 140f is formed between rib 130f and rib 130e. Channel 140g is formed between rib 130g and rib 130f. Channel 140h is formed between rib 130h and rib 130g. Finally, channel 140i is formed between distal interior wall 112 and rib 130h.

In the embodiment illustrated in FIG. 4, ribs 130 are staggered. Ribs 130 are arranged such that the longest rib 130 is furthest from nozzle inlet 102 and the shortest rib 130 is closest to nozzle inlet 102. Thus, length 134h is greater than length 134g. Length 134g is greater than length 134f. Length 134f is greater than length 134e. Length 134e is greater than length 134d. Length 134d is greater than length 134c. Length 134c is greater than length 134b. Length 134b is greater than length 134a. In other embodiments, lengths 134 of adjacent ribs 130 may be the same.

FIG. 6 illustrates a bottom view of the embodiment illustrated in FIG. 4. Under side 106 of nozzle 100 comprises nozzle outlet 150. Nozzle outlet 150 comprises a plurality of channel outlets 160. Channel 140a comprises channel outlet 160a. Channel 140b comprises channel outlet 160b. Channel 140c comprises channel outlet 160c. Channel 140d comprises channel outlet 160d. Channel 140e comprises channel outlet 160e. Channel 140f comprises channel outlet 160f. Channel 140g comprises channel outlet 160g. Channel 140h comprises channel outlet 160h. Finally, channel 140i comprises channel outlet 160i.

In some embodiments, ribs 130 extend beyond under side 106. In other embodiments, ribs 130 do not extend beyond under side 106. In still other embodiments, ribs 130 may terminate before reaching under side 106. In the embodiment shown, ribs 130 are substantially regularly-spaced such that each channel 140 has substantially the same width. In other embodiments, ribs 130 may be irregularly spaced to optimize coolant throughput through channels 140.

One skilled in the art will appreciate that other embodiments of the present disclosure may have a greater or fewer number of ribs and channels. Other embodiments may have one, two, three, four, five, six, seven, eight, nine, ten, eleven, twelve, thirteen, fourteen, fifteen, sixteen, seventeen, eighteen, nineteen, or twenty or more ribs 130 forming two, three, four, five, six, seven, eight, nine, ten, eleven, twelve, thirteen, fourteen, fifteen, sixteen, seventeen, eighteen, nineteen, twenty, or twenty-one or more channels 140.

The optimum number of ribs 130 and channels 140 may depend on the geometry of grinding wheel 20 and the desired performance characteristics of coolant delivery apparatus 10. For example, a thinner grinding wheel 20 may require as few as three ribs 130, while a wider grinding wheel 20 may require ten or more ribs 130.

The number of ribs 130 and width of channels 140 may also depend on the desired volumetric flow rate of coolant through nozzle 100, and the clearance between workpiece 40 and grinding wheel 20. For example, an embodiment of nozzle 100 designed to direct a coolant having a relatively high volumetric flow rate may require more ribs 130 than another embodiment of nozzle 100 designed to direct a coolant having a relatively low volumetric flow rate.

FIG. 7 depicts coolant flowing through coolant delivery apparatus 10. Coolant flowing through nozzle 100 is illustrated as a streamline 300. A person skilled in the art will understand that fluid flow may be modeled using streamlines. In the embodiments illustrated herein, a single streamline 300 is shown traveling through a single channel 140 for the sake of clarity. Such a person will also understand that coolant will flow through all channels 140 in substantially the same manner illustrated by streamline 300.

As discussed above in relation to FIG. 1A, coolant delivery apparatus 10 is configured to be coupled to coolant supply line 36. Coolant supply line 36 is configured to deliver coolant to feed chamber 202 of support member 200. Feed chamber 202 is in fluid communication with nozzle inlet 102 such that coolant may flow from feed chamber 202 through nozzle inlet 102 and into nozzle 100.

Coolant flows in a first direction 302 from feed chamber 202 through nozzle inlet 102 into nozzle 100. First direction 302 is substantially parallel to axis 90 in the illustrated embodiment. Coolant proceeds in first direction 302 until coolant contacts lip 132 of rib 130. Because lip 132 is curved toward the nozzle inlet 102 in the illustrated embodiment, lip 132 catches a volume of coolant and directs coolant into channel 140 at a second direction 304. Second direction 304 is substantially different from first direction 302 in various embodiments. In the illustrated embodiment, second direction 304 is substantially parallel to ribs 130 and is substantially perpendicular to first direction 302 and rotational axis 90. In other words, second direction 304 lies in a plane that is substantially perpendicular to the place in which first direction 302 lies in the illustrated embodiment.

Coolant proceeds in second direction 304 through channel 140 until coolant reaches channel outlet 160. Coolant exits nozzle 100 through channel outlet 160 and nozzle outlet 150 in third direction 306. In the illustrated embodiment, upon exiting channel outlet 160 and nozzle outlet 150, the coolant is travelling in a direction substantially tangent to grinding wheel 20, and in the same direction as grinding wheel 20 is rotating. Coolant is directed to work face 22 of grinding wheel 20, where it dissipates heat and removes chips created by the grinding operation.

One skilled in the art will appreciate that each rib 130 in nozzle 100 redirects the flow direction of coolant in the manner described herein. For example, each lip 132 of each rib 130 catches a volume of coolant and directs coolant into channels 140 and out through nozzle outlet 150. In this manner, the coolant may be distributed evenly across the face of grinding wheel 20 effectively dissipate heat and remove chips created by the grinding operation. In certain embodiments, ribs 130 may be configured such that the volumetric flow rate or fluid flux through each channel 160 is substantially equal.

An alternative embodiment of nozzle 100 is illustrated in FIGS. 8A-8C. As shown in FIG. 8A, in this embodiment nozzle 100 is substantially triangular and under side 106 is substantially flat. As shown in FIG. 8B, four ribs 130 form five channels 140. In the illustrated embodiment, each rib 130 comprises lip 132. Channel 140a is formed between rib 130a and interior proximal wall 110. Channel 140b is formed between rib 130b and rib 130a. Channel 140c is formed between rib 130c and rib 130b. Channel 140d is formed between rib 130d and rib 130c. Channel 140e is formed between distal interior wall 112 and rib 130d. In the illustrated embodiment, under side 106 comprises nozzle outlet 150. In other embodiments, nozzle 150 may be located on top side 104. In still other embodiments, nozzle 150 may be situated between top side 104 and under side 106.

As shown in FIG. 8C, each rib 130 comprises length 134, first height 136, and second height 138. In the illustrated embodiment, first height 136 is greater than second height 138. In other embodiments, first height 136 may be equal to second height 138. One having skill in the art will appreciate that nozzle 100 illustrated in FIGS. 8A-8C functions in substantially the same manner as the embodiment described in FIGS. 1A-7. Each rib 130 in nozzle 100 redirects the flow direction of coolant in the manner described herein. For example, each lip 132 of each rib 130 catches a volume of coolant and directs coolant into channels 140 and out through nozzle outlet 150. In this manner, the coolant may be distributed evenly across the face of grinding wheel 20 to effectively dissipate heat and remove chips created by the grinding operation.

Yet another alternative embodiment of nozzle 100 is shown in FIGS. 9A-9B. This embodiment may be referred to as "fender shaped." Such an embodiment is suited for use in grinding the interior surface of a bearing raceway, to take one example. As in other embodiments previously discussed, the illustrated embodiment of nozzle 100 comprises top 104, under side 106, nozzle inlet 102 and nozzle outlet 150.

An embodiment of nozzle 100 is coupled to support member 200. Support member 200 comprises feed chamber 202 in fluid communication with nozzle inlet 102. Nozzle 100 comprises a proximal internal wall 110 adjacent nozzle inlet 102 and a distal internal wall 112 opposite nozzle inlet 102. The illustrated embodiment comprises four ribs 130 that form five channels 140 within nozzle 100. Ribs 130 comprise lips 132 that curve out of the plane of the rib generally toward nozzle inlet 102. Other embodiments may comprise more or fewer ribs 130 and channels 140. Ribs 130 may be regularly spaced such that channels 140 are approximately the same width, as shown, or ribs 130 may be irregularly spaced to optimize coolant throughput through channels 140. The depicted embodiment of nozzle 100 also comprises nozzle outlet 150. Nozzle outlet 150 comprises five channel outlets 160 in the embodiment shown.

FIGS. 10A and 10B illustrate yet another embodiment of nozzle 100, while FIG. 10C illustrates an embodiment of nozzle 100 in use with a workpiece 40. This embodiment may be referred to as having a "stair-step" shape and is suited for use in grinding operations where grinding wheel 40 has a complex profile, such as the grinding wheel shown in FIG. 10C, to take one example.

Like the other embodiments of nozzle 100 discussed above, the illustrated embodiment comprises an inlet 102, a top surface 104, a bottom surface 106, a proximal wall 110, a distal wall 112, and a nozzle outlet 150. Nozzle 102 may be configured to be coupled to feed chamber 202 of support member 200, or may be configured to be coupled directly to a coolant source (not pictured).

The illustrated embodiment of nozzle 100 comprises fourteen ribs 130 that form fifteen channels 140 and fifteen channel outlets 160. Each rib 130 comprises lip 132 that curves out of the plane of rib 130 toward nozzle inlet 102. Other embodiments may have more or fewer ribs 130, channels 140, and channel outlets 160, depending on the shape of grinding wheel 40. Channels 140 are staggered in a stair-step fashion in the illustrated embodiment.

Various suitable coolants may be used in coolant delivery apparatus 10. The type of coolant used depends upon the type of material being ground, the rate of grinding, the amount of heat generated, and the intended use of the ground material. Coolants may be synthetic, semi-synthetic, water soluble oil, oil, or mineral oil. Coolants are manufactured by, for example, Master Chemical, Cimcool, Quaker Chemical, Castrol Industrial, and ExxonMobil.

The following paragraphs enumerated consecutively from 1 through 33 provide for various aspects of the present invention.

1. In one embodiment, in a first paragraph (1), the present invention provides a nozzle comprising a plurality of internal channels in fluid communication with a nozzle inlet, where: the nozzle inlet is configured to receive a fluid in a first flow direction; and the plurality of internal channels are configured to direct the fluid from the first direction to a second direction substantially perpendicular to the first direction.

2. The nozzle of paragraph 1, where the nozzle is curved about a central axis, and the first flow direction is parallel to the central axis.

3. The nozzle of paragraph 1, where the nozzle outlet comprises one or more channel outlets equal in number to the one or more internal channels.

4. The nozzle of paragraph 1, further comprising: a support member comprising a feed chamber, where the support member is coupled to the nozzle and the feed chamber is in fluid communication with the nozzle inlet.

5. The nozzle of paragraph 1, further comprising a plurality of internal ribs separating the one or more internal channels.

6. The nozzle of paragraph 5, where each rib further comprises a lip that curves out of the plane of the rib.

7. The nozzle of paragraph 5, where each channel is adjacent to at least one rib.

8. A nozzle configured to receive a fluid, the nozzle comprising: an inlet and an outlet; and
a plurality of ribs, each rib comprising a length;
where the length of at least a first rib is less than the length of at least a second rib.

9. The nozzle of paragraph 8, where each rib further comprises a lip curving from the plane of the rib.

10. The nozzle of paragraph 8, where each rib has a first height and a second height, where the first height is greater than the second height.

11. The nozzle of paragraph 8 further comprising:
a top side comprising a first length; and
an under side comprising a second length, where the first length is greater than the second length.

12. The nozzle of paragraph 8, further comprising:
a support member comprising a feed chamber, where the feed chamber is in fluid communication with the inlet.

13. A nozzle comprising a nozzle inlet, a nozzle outlet, and n number of internal ribs between the nozzle inlet and the nozzle outlet, where n is a positive integer.

14. The nozzle of paragraph 13, where the nozzle further comprises (n+1) number of internal channels.

15. The nozzle of paragraph 14, where the nozzle outlet comprises (n+1) number of channel outlets.

16. The nozzle of paragraph 14, further comprising a proximal wall and a distal wall, where (n−1) number of internal channels are formed between adjacent ribs, one internal channel is formed between a rib and the proximal wall, and one internal channel is formed between a rib and the distal wall.

17. The nozzle of paragraph 14, where the nozzle comprises an under side and the channel outlets are disposed along the under side.

18. The nozzle of paragraph 13, where n is selected from the group comprising 1, 2, 3, 4, 5, 6, 7, 8, 9, 10, 11, 12, 13, 14, 15, 16, 17, 18, 19, and 20.

19. An apparatus comprising:
a support member comprising a feed chamber; and
a nozzle comprising a nozzle inlet in fluid communication with the feed chamber, a plurality of internal channels in fluid communication with the nozzle inlet, and a nozzle outlet in fluid communication with the internal channels;
where the nozzle inlet is configured to receive a fluid in a first flow direction and the plurality of internal channels are configured to direct the fluid from the first direction to a second direction substantially perpendicular to the first direction.

20. The apparatus of paragraph 19, where the support member is configured to be coupled to a spindle housing.

21. The apparatus of paragraph 19, further comprising a plurality of ribs between and forming the plurality of internal channels.

22. The apparatus of paragraph 19, where the nozzle outlet further comprises a plurality of channel outlets.

23. A method of applying a coolant to a grind zone, comprising:
obtaining a system comprising:
a grinding wheel configured to rotate
a work piece;
a coolant; and
a nozzle comprising a nozzle inlet, a plurality of internal channels in fluid communication with the nozzle inlet, and a nozzle outlet in fluid communication with the nozzle outlet, where the nozzle inlet is configured to receive the coolant in a first flow direction and the plurality of internal channels are configured to direct the coolant from the first direction to a second direction substantially different from the first direction;
rotating the grinding wheel;
contacting the grinding wheel to the work piece at a grind zone;
supplying the coolant to the nozzle; and
applying the coolant to the grind zone with the nozzle.

24. A method of applying a coolant to a grind zone, comprising:
obtaining a system comprising:
a grinding wheel configured to rotate;
a work piece;
a coolant; and
a nozzle comprising:
a nozzle inlet and a nozzle outlet; and
a plurality of ribs forming a plurality of channels in fluid communication with the nozzle inlet and the nozzle outlet, each rib comprising a length;
where the length of at least a first rib is less than the length of at least a second rib; rotating the grinding wheel;
contacting the grinding wheel to the work piece at a grind zone;
supplying the coolant to the nozzle such that the coolant is directed through the nozzle inlet to the plurality of channels and out the nozzle outlet; and
applying the coolant to the grind zone with the nozzle.

25. A method of applying a coolant to a grind zone, comprising:
obtaining a system comprising:
a grinding wheel configured to rotate;
a work piece;
a coolant; and
a nozzle comprising a nozzle inlet, n number of ribs forming (n−1) number of channels and a nozzle outlet, where n is a positive integer and the channels are in fluid communication with the nozzle inlet and nozzle outlet;
rotating the grinding wheel;
contacting the grinding wheel to the work piece at a grind zone; and
supplying the coolant to the nozzle such that the coolant is directed through the nozzle inlet to
the plurality of channels and out the nozzle outlet; and
applying the coolant to the grind zone with the nozzle.

26. A method of applying a coolant to a grind zone, comprising:
obtaining a system comprising:
a grinding wheel configured to rotate;
a work piece;
a coolant; and
an apparatus comprising:
a nozzle comprising a plurality of internal channels in fluid communication with a nozzle inlet; and
a support member coupled to the nozzle, where the support member comprises a feed chamber in fluid communication with the nozzle inlet;
where the nozzle inlet is configured to receive the coolant in a first flow direction and the plurality of internal channels are configured to direct the coolant from the first direction to a second direction substantially different from the first direction;
rotating the grinding wheel;
contacting the grinding wheel to the work piece at a grind zone;
supplying the coolant to the apparatus; and
applying the coolant to the grind zone with the nozzle.

What is claimed is:

1. A nozzle comprising a nozzle inlet, one or more internal channels in fluid communication with the nozzle inlet, a nozzle outlet in fluid communication with the one or more internal channels, a proximal wall and a distal wall,
where: the nozzle inlet is configured to receive a fluid in a first flow direction; and the one or more internal channels are configured to direct the fluid from the first direction to a second direction substantially different from the first direction,
where: the internal channels are formed by n number of internal ribs between the nozzle inlet and the nozzle outlet, where n is a positive integer,
where: the nozzle further comprises (n+1) number of internal channels, and
where: (n−1) number of internal channels are formed between adjacent ribs, one internal channel is formed between a rib and the proximal wall, and one internal channel is formed between a rib and the distal wall.

2. The nozzle of claim 1, where the nozzle is curved about a central axis, and the first flow direction is parallel to the central axis.

3. The nozzle of claim 1, where the nozzle outlet comprises one or more channel outlets equal in number to the one or more internal channels.

4. The nozzle of claim 1, further comprising: a support member comprising a feed chamber, where the support member is coupled to the nozzle and the feed chamber is in fluid communication with the nozzle inlet.

5. The nozzle of claim 1, further comprising a plurality of internal ribs separating the two or more internal channels.

6. The nozzle of claim 5, where each rib further comprises a lip that curves out of a plane of the rib.

7. The nozzle of claim 5, where each channel is adjacent to at least one rib.

8. The nozzle of claim 1, wherein each rib comprising a length; where the length of at least a first rib is less than the length of at least a second rib.

9. The nozzle of claim 8, where each rib further comprises a lip curving from the plane of the rib.

10. The nozzle of claim 8, where each rib has a first height and a second height, where the first height is greater than the second height.

11. The nozzle of claim 8 further comprising: a top side comprising a first length; and an under side comprising a second length, where the first length is greater than the second length.

12. The nozzle of claim 8, further comprising: a support member comprising a feed chamber, where the feed chamber is in fluid communication with the inlet.

13. The nozzle of claim 1, where the nozzle outlet comprises (n+1) number of channel outlets.

14. The nozzle of claim 1, where the nozzle comprises an under side and the channel outlets are disposed along the under side.

15. The nozzle of claim 1, where n is selected from the group comprising 1, 2, 3, 4, 5, 6, 7, 8, 9, 10, 11, 12, 13, 14, 15, 16, 17, 18, 19, and 20.

* * * * *